(12) United States Patent
Yoshida et al.

(10) Patent No.: US 8,755,096 B2
(45) Date of Patent: Jun. 17, 2014

(54) IMAGE SENSOR UNIT AND IMAGE READING APPARATUS

(75) Inventors: Hidemasa Yoshida, Saitama (JP); Tomoyuki Horiguchi, Saitama (JP); Akifumi Fujiwara, Saitama (JP); Hidehisa Takahashi, Saitama (JP); Shuuichi Shimoda, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 13/570,970

(22) Filed: Aug. 9, 2012

(65) Prior Publication Data

US 2013/0038914 A1 Feb. 14, 2013

(30) Foreign Application Priority Data

Aug. 9, 2011 (JP) ................................. 2011-174403
Jul. 24, 2012 (JP) ................................. 2012-163536

(51) Int. Cl.
*H04N 1/04* (2006.01)
(52) U.S. Cl.
USPC ............ 358/475; 358/484; 358/483; 358/482
(58) Field of Classification Search
USPC .......................... 358/475, 484, 483, 482, 497
See application file for complete search history.

(56) References Cited

U.S. PATENT DOCUMENTS

| | | | |
|---|---|---|---|
| 5,119,232 A | 6/1992 | Daley et al. | |
| 5,166,832 A | 11/1992 | Zychowicz | |
| 5,182,445 A | 1/1993 | Yamashita | |
| 5,263,077 A | 11/1993 | Cowan et al. | |
| 5,673,122 A | 9/1997 | Omori | |
| 5,864,408 A | 1/1999 | Kumashiro | |
| 5,953,133 A | 9/1999 | Fujimiya et al. | |
| 6,166,832 A | 12/2000 | Fujimoto | |
| 6,724,503 B1 | 4/2004 | Sako et al. | |
| 7,042,598 B2 | 5/2006 | Payne | |
| 7,190,493 B2 | 3/2007 | Maki et al. | |
| 7,284,891 B2 | 10/2007 | Saito et al. | |
| 7,538,911 B2 | 5/2009 | Sakurai et al. | |
| 7,593,143 B2 | 9/2009 | Herloski | |

(Continued)

FOREIGN PATENT DOCUMENTS

| | | |
|---|---|---|
| EP | 0 252 709 A2 | 1/1988 |
| EP | 0 557 891 A1 | 9/1993 |

(Continued)

OTHER PUBLICATIONS

Exrended European Search Report for EP 11194502.8, mail date Dec. 4, 2012. Cited in related co-pending U.S. Appl. No. 13/570,645.

(Continued)

*Primary Examiner* — Houshang Safaipour
(74) *Attorney, Agent, or Firm* — Rossi, Kimms & McDowell LLP (57) ABSTRACT

An image sensor unit has a light emitting module and a light guide that guides light emitted by the light emitting module to a bill, the light guide has an incident surface on which the light emitted by the light emitting module is incident, a reflection surface that reflects the light having entered the light guide through the incident surface, and an emission surface from which the light reflected by the reflection surface is emitted toward the bill, and the reflection surface is formed by a plurality of contiguous flat surfaces.

19 Claims, 9 Drawing Sheets

(56) References Cited

U.S. PATENT DOCUMENTS

| | | | |
|---|---|---|---|
| 7,722,223 B2 | 5/2010 | Saito et al. | |
| 7,760,403 B2 * | 7/2010 | Sakurai | 358/484 |
| 7,796,310 B2 | 9/2010 | Hasegawa et al. | |
| 7,859,726 B2 | 12/2010 | Endo et al. | |
| 8,018,630 B2 | 9/2011 | Herloski | |
| 8,049,937 B2 | 11/2011 | Saito | |
| 8,228,567 B2 * | 7/2012 | Kim | 358/475 |
| 8,310,737 B2 | 11/2012 | Nagao et al. | |
| 2002/0114152 A1 | 8/2002 | Fujino et al. | |
| 2005/0150956 A1 | 7/2005 | Ikeda et al. | |
| 2005/0195618 A1 | 9/2005 | Uemura et al. | |
| 2006/0008295 A1 | 1/2006 | Kohchi et al. | |
| 2006/0152942 A1 | 7/2006 | Saito et al. | |
| 2007/0285740 A1 | 12/2007 | Onishi et al. | |
| 2008/0068682 A1 | 3/2008 | Morikawa | |
| 2008/0112017 A1 | 5/2008 | Nagasaka | |
| 2009/0003000 A1 | 1/2009 | Saito et al. | |
| 2009/0027743 A1 | 1/2009 | Han | |
| 2009/0218525 A1 | 9/2009 | Ikeda et al. | |
| 2009/0294630 A1 | 12/2009 | Saito et al. | |
| 2010/0046045 A1 | 2/2010 | Nagao et al. | |
| 2010/0231987 A1 | 9/2010 | Takeuchi | |
| 2012/0147442 A1 | 6/2012 | Kiyota et al. | |
| 2012/0154876 A1 | 6/2012 | Shimoda | |
| 2012/0154877 A1 | 6/2012 | Kisara et al. | |
| 2012/0162727 A1 | 6/2012 | Shimoda et al. | |
| 2012/0287484 A1 | 11/2012 | Shimoda et al. | |
| 2013/0009037 A1 | 1/2013 | Takahashi | |
| 2013/0038912 A1 | 2/2013 | Horiguchi et al. | |
| 2013/0038913 A1 | 2/2013 | Shimoda et al. | |
| 2013/0038914 A1 | 2/2013 | Yoshida et al. | |
| 2013/0181311 A1 | 7/2013 | Sugiyama | |
| 2013/0265617 A1 | 10/2013 | Murakami et al. | |

FOREIGN PATENT DOCUMENTS

| | | |
|---|---|---|
| EP | 0 844 784 A2 | 11/1997 |
| EP | 1 049 055 A2 | 4/2000 |
| EP | 1 049 055 A2 | 11/2000 |
| EP | 1 471 472 A2 | 4/2004 |
| EP | 1 835 469 A2 | 9/2007 |
| EP | 2 246 825 A1 | 4/2009 |
| EP | 2 134 071 A2 | 12/2009 |
| FR | 2 655 799 A1 | 6/1991 |
| JP | 04-150454 | 5/1992 |
| JP | 8-223417 A | 8/1996 |
| JP | 09-214675 A | 8/1997 |
| JP | 10-285330 A | 10/1998 |
| JP | 11-75015 A | 3/1999 |
| JP | 11-084544 | 3/1999 |
| JP | 2000-324308 | 11/2000 |
| JP | 2001-005122 A | 1/2001 |
| JP | 2001-223852 | 8/2001 |
| JP | 2001-272677 | 10/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-198106 A | 7/2005 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-42425 A | 2/2008 |
| JP | 2008-112301 A | 5/2008 |
| JP | 2009-053316 A | 3/2009 |
| JP | 2009-086488 A | 4/2009 |
| JP | 2010-136061 A | 6/2010 |
| JP | 2010213039 A | 9/2010 |
| JP | 2011-124741 A | 6/2011 |
| WO | 97/23991 | 7/1997 |
| WO | 2006/137263 A1 | 12/2006 |
| WO | 2007/077760 A1 | 7/2007 |
| WO | 2008/013234 A1 | 1/2008 |

OTHER PUBLICATIONS

Japanese Office Action for JP 2011-236415, mail date Nov. 13, 2012. Cited in related co-pending U.S. Appl. No. 13/570,645.
Japanese Office Action for JP 2010-282128, dated Nov. 6, 2012. Cited in related co-pending U.S. Appl. No. 13/570,645.
International Search Report for PCT/JP2010/069500, mail date Nov. 30, 2012. Cited in related co-pending U.S. Appl. No. 13/570,645.
Japanese Office Action for JP 2012-247653, mail date Dec. 11. 2012. Cited in related co-pending U.S. Appl. No. 13/328,553.
Extended European search report issued in corresponding European Patent Application No. 12179608.0 dated Nov. 21, 2012. Cited in related co-pending U.S. Appl. No. 13/570,645.
Korean Office Action issued in KR10-2012-49430, dated Jun. 27, 2013. Cited in related U.S. Appl. No. 13/467,357.
European Office Action issued in EP12167240.6, dated May 17, 2013. Cited in related U.S. Appl. No. 13/467,357.
Japanese Office Action issued in JP2010-293227, dated Dec. 11, 2012. Cited in related U.S. Appl. No. 13/338,418.
Japanese Office Action issued in JP2012-087401, dated Apr. 30, 2013. Cited in related U.S. Appl. No. 13/467,357.
Japanese Office Action cited in Japanese counterpart application No. JP2012-163536, dated Sep. 17, 2013.

* cited by examiner

IMAGE SENSOR UNIT AND IMAGE READING APPARATUS

CROSS-REFERENCE TO RELATED APPLICATIONS

This application is based upon and claims the benefit of priority of the prior Japanese Patent Application No. 2011-174403, filed on Aug. 9, 2011, and the Japanese Patent Application No. 2012-163536, filed on Jul. 24, 2012, the entire contents of which are incorporated herein by reference.

BACKGROUND OF THE INVENTION

1. Field of the Invention

The present invention relates to an image sensor unit used in an image reading apparatus, such as a copying machine, image scanner, facsimile and so on, and the image reading apparatus using the image sensor unit. In particular, it relates to an image sensor unit that reads image information from a recording medium, such as a bill, security and so on, and an image reading apparatus that authenticates the recording medium.

2. Description of the Related Art

For example, Japanese Laid-open Patent Publication No. 2007-116590 discloses an image reading apparatus that handles a bill.

With such an image reading apparatus, a gap of a predetermined dimension is formed between an image sensor unit and a light source unit for transmission reading to allow smooth passage of a bill. The illuminance distribution of illumination light emitted by a light source for reflection reading (in particular, the illuminance distribution in the direction of the normal to the bill passing through the apparatus) is preferably uniform. If the illuminance distribution is nonuniform, the illuminance of the light illuminating the bill differs between a part of the bill that passes through a point closer to the image sensor unit and a part of the bill that passes through a point closer to the light source unit for transmission reading if the bill moves in the direction of the normal thereto or is creased. Then, there is a possibility that the illuminance of the reflection light from the bill is nonuniform, and the reading accuracy deteriorates.

SUMMARY OF THE INVENTION

In view of the circumstances described above, an object of the present invention is to provide an image sensor unit and an image reading apparatus that can provide a uniform illuminance distribution of illumination light emitted to a passage space for an object to be illuminated, such as a bill, in particular, a uniform illuminance distribution in the direction of a normal to a surface to be read of the passing object to be illuminated.

An image sensor unit according to the present invention is an image sensor unit that reads image information from an object to be illuminated, comprising: a light source; and a light guide that guides light emitted by the light source to the object to be illuminated, wherein the light guide comprises: an incident surface on which the light emitted by the light source is incident; a reflection surface that reflects the light having entered the light guide through the incident surface; and an emission surface from which the light reflected by the reflection surface is emitted toward the object to be illuminated, and the reflection surface is formed by a plurality of flat surfaces.

In the image sensor unit according to the present invention, the incident surface faces the light source at an angle.

In the image sensor unit according to the present invention, a contour of a cross section of the emission surface taken along a plane perpendicular to a main scan direction is a concave curve.

In the image sensor unit according to the present invention, the incident surface has a projection and a recess formed in a main scan direction.

An image reading apparatus according to the present invention is an image reading apparatus that reads image information from an object to be illuminated, comprising: an image sensor unit that comprises: a light source; and a light guide that comprises an incident surface on which light emitted by the light source is incident, a reflection surface that is formed by a plurality of flat surfaces and reflects the light having entered the light guide through the incident surface, and an emission surface from which the light reflected by the reflection surface is emitted toward the object to be illuminated, and the image sensor unit reads the image information from the object to be illuminated while relatively moving the object to be illuminated and the image sensor unit with respect to each other.

In the image reading apparatus according to the present invention, the incident surface faces the light source at an angle.

In the image reading apparatus according to the present invention, a contour of a cross section of the emission surface taken along a plane perpendicular to a main scan direction is a concave curve.

In the image reading apparatus according to the present invention, the incident surface has a projection and a recess formed in a main scan direction.

DETAILED DESCRIPTION OF THE PREFERRED EMBODIMENTS

In the following, an embodiment of the present invention will be described in detail with reference to the drawings.

Figure 1:
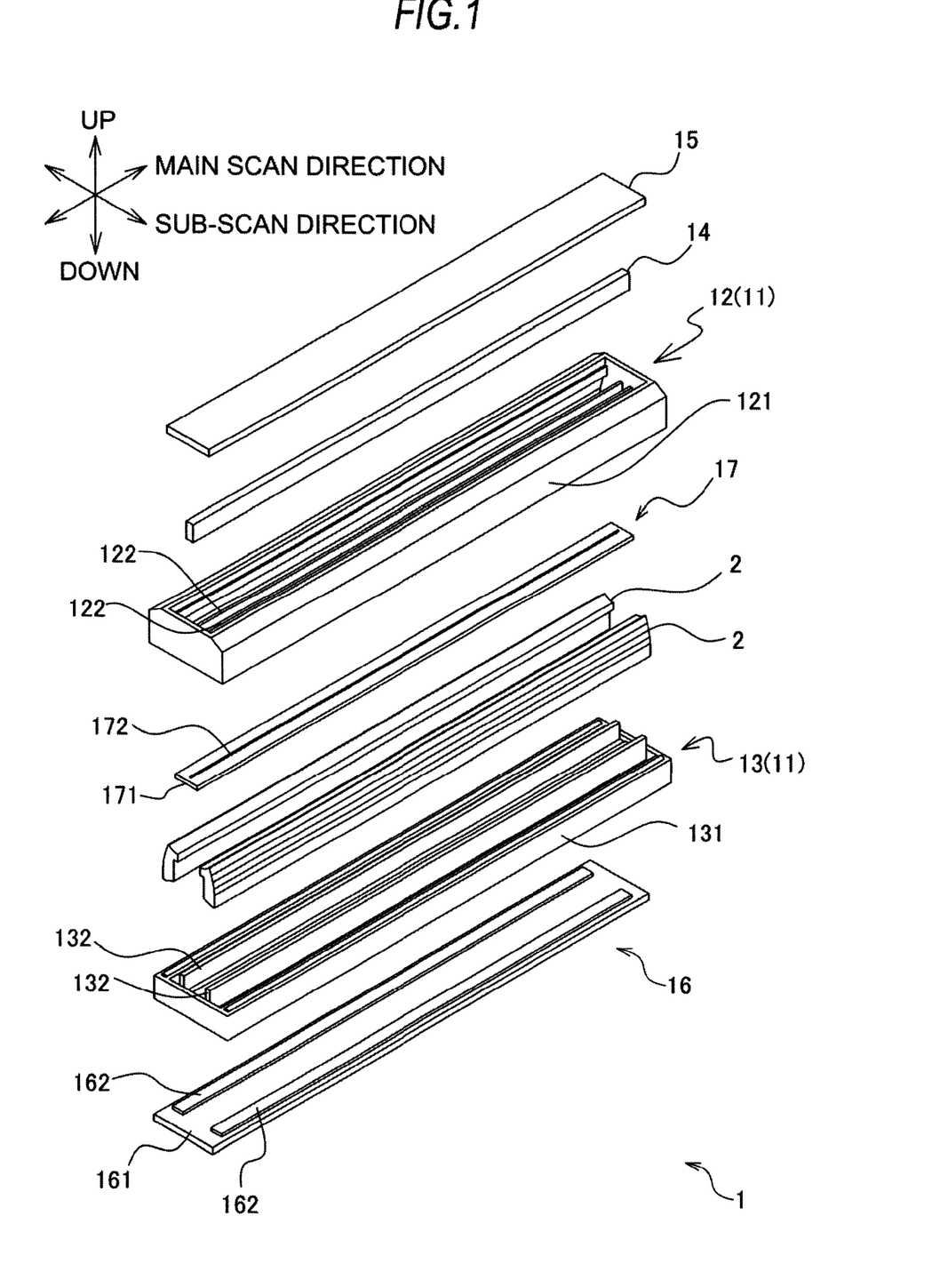
FIG. 1 is a schematic exploded perspective view showing a configuration of an image sensor unit according to an embodiment of the present invention.
Figure 2:
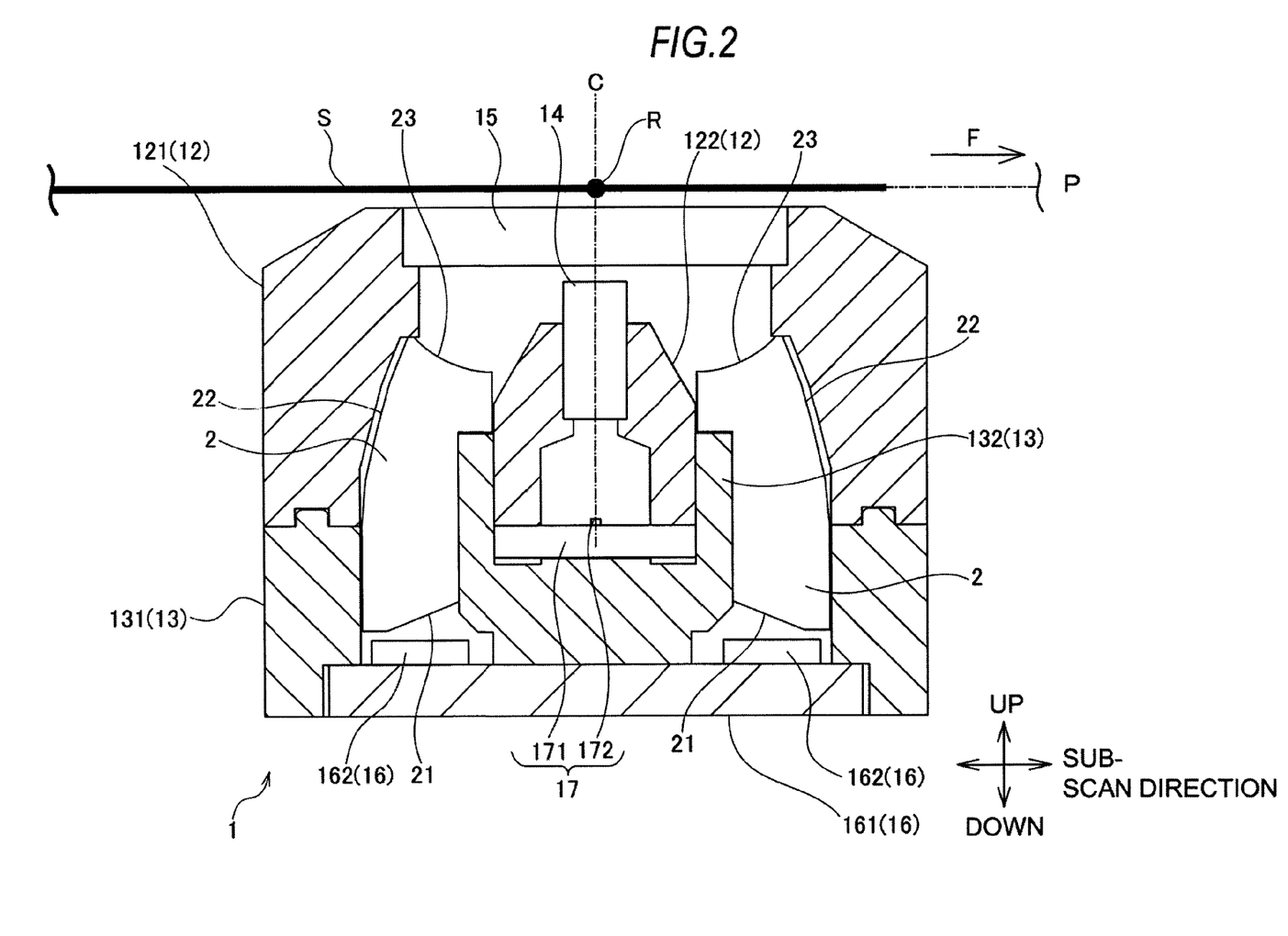
FIG. 2 is a schematic sectional view showing the configuration of the image sensor unit according to the embodiment of the present invention.

First, an overall configuration of an image sensor unit 1 according to the embodiment of the present invention will be described with reference to FIGS. 1 and 2. FIG. 1 is a schematic exploded perspective view showing a configuration of the image sensor unit 1. FIG. 2 is a schematic sectional view showing the configuration of the image sensor unit 1. In the drawings, the arrow F indicates a conveyance direction of a bill S, which is an object to be illuminated. In the drawings, alternate long and short dashed line P indicates a conveyance path of the bill S. For convenience of explanation, a part of the image sensor unit 1 over which the bill S passes will be referred to as an upper part of the image sensor unit 1, and the part opposite to the upper part will be referred to as a lower part. As shown in FIGS. 1 and 2, the image sensor unit 1 comprises a light guide 2, a housing 11, a light source substrate 16, a rod lens array 14 serving as an imaging element, a sensor substrate 17 and a cover member 15.

The housing 11 is a member that houses the image sensor unit 1 and comprises an upper housing 12 and a lower housing 13. The upper housing 12 and the lower housing 13 are rod-like members elongated in a main scan direction and detachably coupled to each other in the vertical direction. The upper housing 12 and the lower housing 13 are elongated frame-like members with openings formed in the top and the bottom. The upper housing 12 and the lower housing 13 are made of a light shielding material, such as a resin material that is colored black, for example. The upper housing 12 has side wall parts 121 forming the opposite end parts in a sub-scan direction and an upper holding part 122 provided between the side wall parts 121. The upper holding part 122 is a part that holds the rod lens array 14 and the sensor substrate 17 and comprises two ribs extending in the main scan direction. The rod lens array 14 can be fitted from above into the gap between the two ribs and held there. The lower housing 13 has side wall parts 131 forming the opposite end parts in the sub-scan direction and a lower holding part 132 provided between the side wall parts 131. The lower holding part 132 is a part that holds the light guide 2 and the sensor substrate 17. The lower holding part 132 has two substantially parallel ribs that extend in the main scan direction and protrude upward and a bottom part provided between the two ribs. A light guide 2 can be fitted from above into each of the gaps between the two ribs and the side wall parts 131 and held there. The sensor substrate 17 can be fitted from above into the gap between the two ribs and held there.

The light source substrate 16 has a rectangular substrate 161 elongated in the main scan direction and two light emitting modules 162 mounted on a surface of the substrate 161. The two light emitting modules 162 are linear light sources extending in the main scan direction. The two light emitting modules 162 are disposed in parallel with each other at a predetermined distance. The two light emitting modules 162 can emit light in a predetermined one or more colors. For example, the two light emitting modules 162 can be an array of light emitting elements (LEDs, for example) of red color, green color and blue color arranged in the main scan direction. In addition to these light emitting elements, the two light emitting modules 162 may be an array of elements that emit ultraviolet light (ultraviolet LEDs, for example) or elements that emit infrared light (infrared LEDs, for example).

The rod lens array 14 is a member that focuses light (image information) from the bill S on a photoelectric conversion module 172 disposed on the sensor substrate 17. The rod lens array 14 has an incident surface on which the light from the bill S is incident and an emission surface from which light is emitted to the photoelectric conversion module 172. The rod lens array 14 can be a linear array of a plurality of rod lenses of an erect equal magnification type arranged in the main scan direction. Although the rod lens array 14 is described as the imaging element herein, the imaging element is not limited to the rod lens array 14. The imaging element may be any of various well-known lens arrays, such as a micro lens array. The photoelectric conversion module 172 receives the light emitted from the emission surface of the rod lens array 14 and converts the light into an electric signal. The sensor substrate 17 has a substantially rectangular substrate 171 elongated in the main scan direction and the photoelectric conversion module 172 having a linear shape extending in the main scan direction mounted on the substrate 171. For example, the photoelectric conversion module 172 includes a plurality of photoelectric conversion elements disposed in a line in the main scan direction. Alternatively, the photoelectric conversion module 172 may be a line sensor. The photoelectric conversion elements and the line sensor can be any of various well-known photoelectric conversion elements and line sensors.

The cover member 15 has a capability of protecting the light guide 2 and the rod lens array 14 and a capability of preventing dust or the like from entering the image sensor unit 1. The cover member 15 is disposed on the top of the upper housing 12. The cover member 15 is a substantially transparent plate-like member made of glass or a transparent resin material and is disposed with its plane being parallel with the conveyance direction F of the bill S.

The light guide 2 is an optical member that guides the light emitted by the light emitting module 162 toward the bill S. The light emitting module 162 and the light guide 2 function as an illumination apparatus that illuminates the bill S. The light guide 2 is a rod-like member elongated in the main scan direction and is made of a substantially transparent material, such as an acrylic resin and polycarbonate. The light guide 2 has an incident surface 21 on which the light emitted by the light emitting module 162 is incident, a reflection surface 22 that reflects the light having entered the light guide 2 through the incident surface 21, and an emission surface 23 from which the light reflected by the reflection surface 22 is emitted toward a reading line R set outside (on the bill S).

Figure 3A:
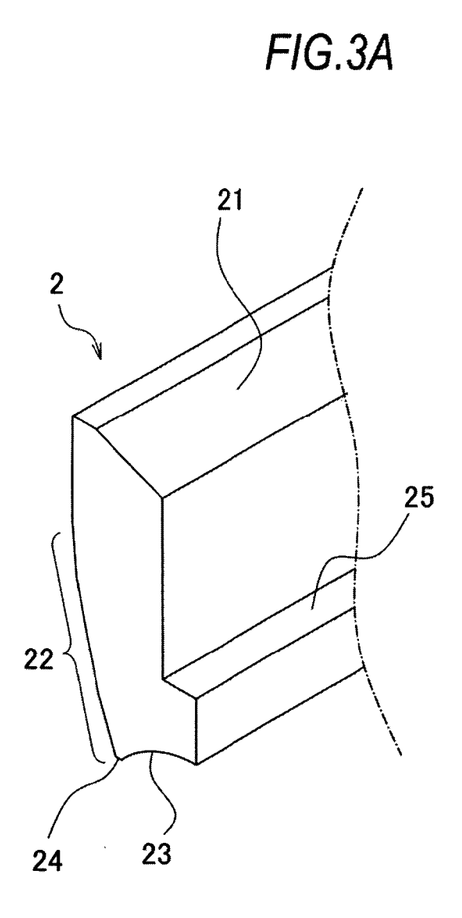
FIG. 3A is a perspective view showing a configuration of a light guide viewed from the side of an incident surface.
Figure 3B:
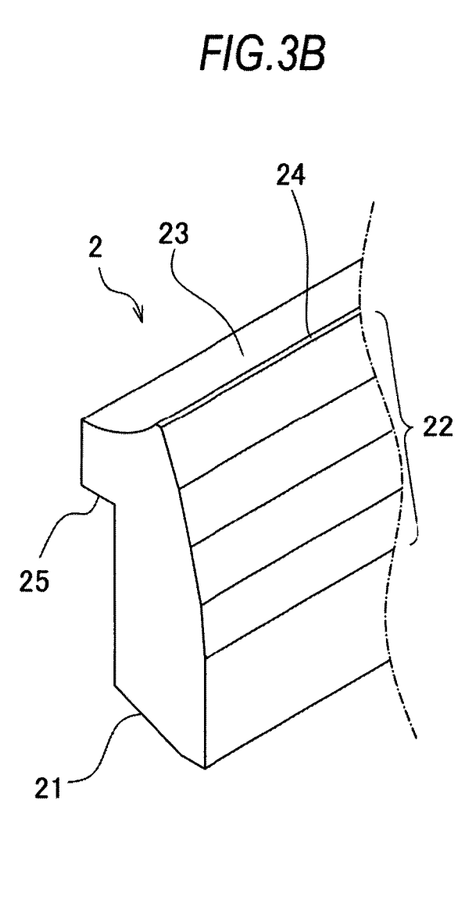
FIG. 3B is a perspective view showing the configuration of the light guide viewed from the side of a reflection surface.
Figure 3C:
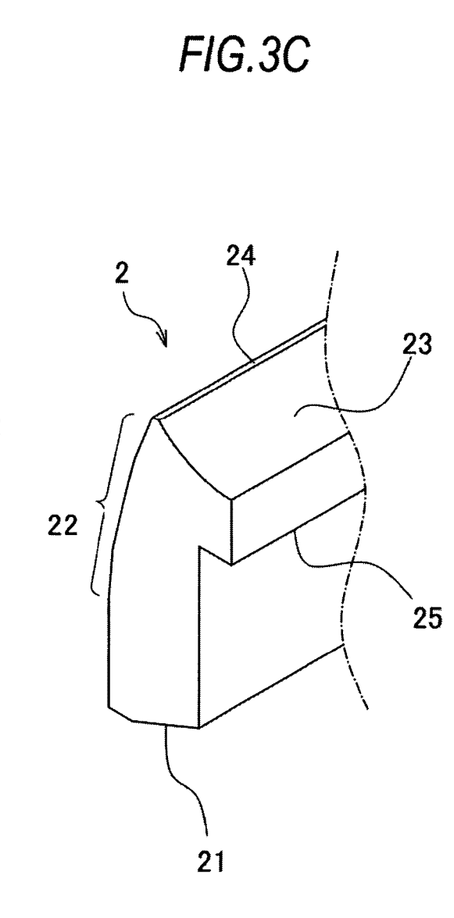
FIG. 3C is a perspective view showing the configuration of the light guide viewed from the side of an emission surface.

The configuration of the light guide 2 will be described in further detail by mainly referring to FIGS. 3A to 3C. FIG. 3A is a perspective view of the light guide 2 viewed from the side of the incident surface 21. FIG. 3B is a perspective view of the light guide 2 viewed from the side of the reflection surface 22. FIG. 3C is a perspective view of the light guide 2 viewed from the emission surface 23.

The incident surface 21 is a surface formed at the bottom of the light guide 2. The incident surface 21 is a narrow band-like flat surface elongated in the main scan direction and is inclined at a predetermined angle (27° in this embodiment) with respect to the sub-scan direction when viewed from the main scan direction.

The reflection surface 22 is located in an upper part of the light guide 2 and formed on one side in the sub-scan direction. The reflection surface 22 is formed by a combination of a plurality of (four in this embodiment) contiguous narrow band-like flat surfaces elongated in the main scan direction. The angles between the plurality of flat surfaces forming the reflection surface 22 and the incident surface 21 are different. The plurality of flat surfaces forming the reflection surface 22 are arranged along an arc-like curve (such as an elliptic or parabolic curve, R=17.4 in this embodiment) and are contiguous to each other at an obtuse angle (175° in this embodiment).

The emission surface 23 is a surface formed at the top of the light guide 2 (on the opposite side to the incident surface 21) on the other side in the sub-scan direction. The emission surface 23 is a concave surface (R=3.3 mm in this embodiment) the contour line of the cross section of which taken along a plane perpendicular to the main scan direction is concave. The emission surface 23 may be a curved surface the contour line of the cross section of which taken along a plane perpendicular to the main scan direction is an arc-like curve (such as an elliptic curve or a parabola). Alternatively, the contour line of the cross section of the emission surface 23 taken along a plane perpendicular to the main scan direction may be formed by a plurality of straight lines. That is, the emission surface 23 can be a surface formed by a combination of a plurality of flat surfaces as with the reflection surface 22. The other surfaces including the reflection surface 22 than the incident surface 21 and the emission surface 23 substantially serve as reflection surfaces.

The incident surface 21, the reflection surface 22 and the emission surface 23 according to this embodiment can have any curvature and shape of the curved surface depending on the required illumination distribution.

The light guide 2 further has a first locking surface 24 and a second locking surface 25 for positioning the light guide 2 with respect to the housing 11. The first locking surface 24 faces upward and is formed at the upper end of the light guide 2, for example. The second locking surface 25 faces downward and is formed below the emission surface 23 so as to be opposed to the first locking surface 24.

Next, an assembly of the image sensor unit 1 will be described with reference to FIGS. 1 and 2. To the upper holding part 122 of the upper housing 12, the rod lens array 14 is assembled from above, and the sensor substrate 17 is assembled from below. Then, the cover member 15 is assembled from above to the top of the upper housing 12. The two light guides 2 are assembled from above into the gaps between the two ribs of the lower holding part 132 and the side wall parts 131 of the lower housing 13. The light source substrate 16 is assembled from below to the bottom of the lower housing 13.

Then, the upper housing 12 and the lower housing 13 are coupled to each other in the vertical direction. Then, each of the two light emitting modules 162 mounted on the light source substrate 16 faces the incident surface 21 of the corresponding one of the two light guides 2 with a predetermined gap interposed therebetween. The light emitting modules 162 are configured to emit light upward. On the other hand, the incident surface 21 of the light guide 2 is inclined at a predetermined angle with respect to the sub-scan direction. That is, the light emitting module 162 and the incident surface 21 of the light guide 2 face each other at a predetermined angle. Therefore, the light emitted by the light emitting module 162 is not incident on the incident surface 21 at right angles but at an inclined angle.

The light guide 2 is housed with the side of the reflection surface 22 being located closer to the side wall part 121 of the upper housing 12 and the side wall part 131 of the lower housing 13 and the emission surface 23 facing to the reading line R for the bill S. As a result, the illumination light emitted from the emission surface 23 of the light guide 2 generally travels in a diagonally upward direction inclined toward the rod lens array 14.

The first locking surface 24 of the light guide 2 faces a downward facing surface formed on the upper housing 12. On the other hand, the second locking surface 25 of the light guide 2 faces an upward facing surface formed on the lower housing 13. Thus, the light guide 2 is positioned and held by being housed in the space between the upper housing 12 and the lower housing 13.

The sensor substrate 17 is positioned and held by caulking or the like on the upper holding part 122 of the upper housing 12. The emission surface (the lower surface) of the rod lens array 14 faces the photoelectric conversion module 172 mounted on the sensor substrate 17. The photoelectric conversion module 172 is positioned on an optical axis C of the rod lens array 14. The incident surface (the upper surface) of the rod lens array 14 faces the cover member 15. The reading line R for the bill S lies on a point above the cover member 15 on the optical axis C of the rod lens array 14.

Figure 4:
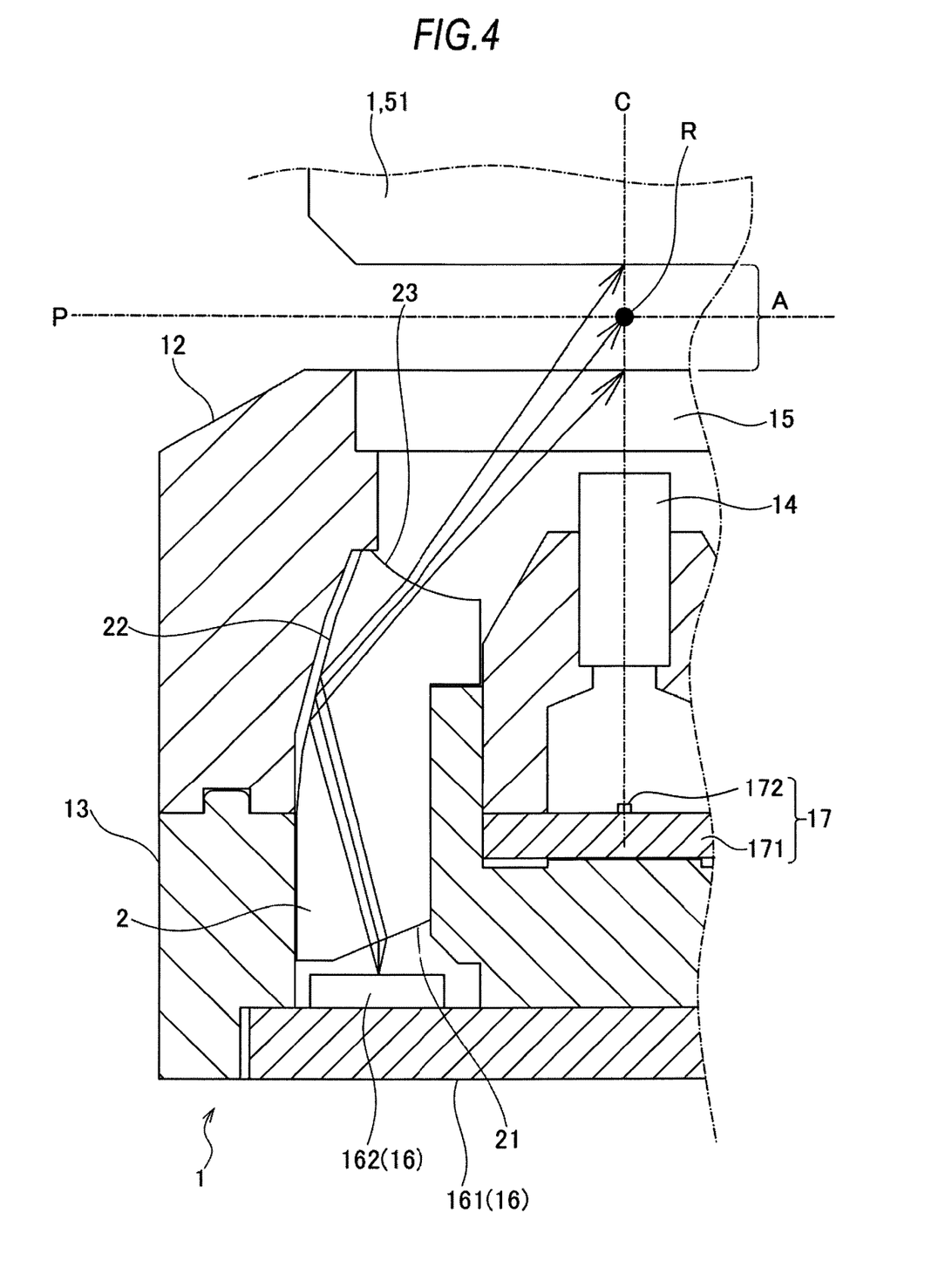
FIG. 4 is a sectional view showing a positional relationship between the light guide and a light source and an optical path in the image sensor unit.

Next, an optical path in the image sensor unit 1 will be described. FIG. 4 is a schematic sectional view showing a positional relationship between the light emitting module 162 on the light source substrate 16 and the light guide 2 and an optical path in the image sensor unit 1. Although FIG. 4 shows only one of the light guides 2, the same description holds true for the other light guide 2. As shown in FIG. 4, a light source unit 51 for transmission reading or another image sensor unit 1 is disposed to face the image sensor unit 1 at a predetermined distance. A space through which the bill S can pass is formed between the image sensor unit 1 and the light source unit 51 for transmission reading or between the image sensor units 1. The space is referred to as a passage space A for the bill S.

As shown in FIG. 4, the light emitted by the light emitting module 162 enters the light guide 2 through the incident surface 21. A light emission surface of the light emitting module 162 and the incident surface 21 face each other at an angle, and the normal to the incident surface 21 is inclined toward the reflection surface 22. Therefore, the incident light reaches the reflection surface 22 after being refracted at the incident surface 21. Since the plurality of flat surfaces forming the reflection surface 22 are at different angles with respect to the incident surface 21, the light having reaching the reflection surface 22 is reflected by the flat surfaces in different directions and travels in the different directions. The reflection light from the reflection surface 22 does not converge but diffuses before being emitted from the emission surface 23, and then reaches the reading line R through the cover member 15. Since the emission surface 23 is a concave surface the contour of the cross section of which taken along a plane perpendicular to the main scan direction is concave, the illumination light emitted from the emission surface 23 does not converge but diffuses. In this way, the light incident on the light guide 2 diffuses at the reflection surface 22 and the emission surface 23. Thus, the illuminance distribution of the illumination light reaching the reading line R in the passage space A for the bill S can be made uniform in the vertical direction (in the direction of the normal to the surface of the bill S) and the sub-scan direction.

With such a configuration, furthermore, the incident light on the incident surface 21 is refracted toward the reflection surface 22. Therefore, the incident light on the incident surface 21 can be efficiently guided to the emission surface 23.

The angle between the normal to the incident surface 21 of the light guide 2 and the light emission surface of the light emitting module 162 is not limited to a particular angle. Any angle is possible that allows the light emitted by the light emitting module 162 to be refracted and guided to the reflection surface 22 while preventing the light from directly reaching the emission surface 23. Therefore, the angle can be appropriately set depending on the index of refraction of the light guide 2, the distance between the incident surface 21 and the emission surface 23 or the like.

Figure 5:
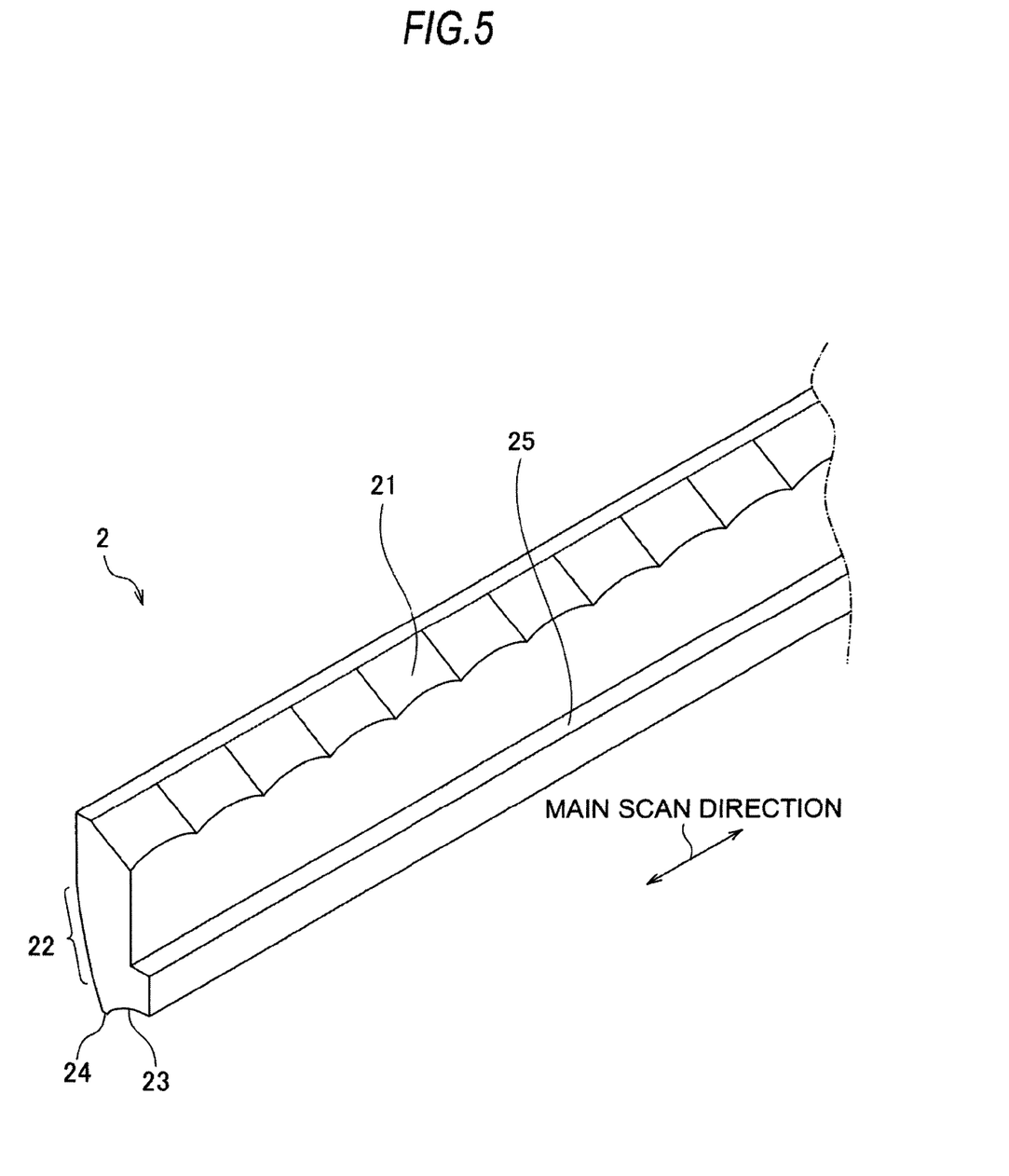
FIG. 5 is a perspective view showing a modification of the configuration of the incident surface of the light guide viewed from the side of the incident surface.

The light guide 2 may be configured to provide a uniform illuminance distribution in the main scan direction. FIG. 5 is a schematic perspective view showing a configuration of the light guide 2 capable of providing a uniform illuminance distribution in the main scan direction. As shown in FIG. 5, the incident surface 21 of the light guide 2 has a plurality of projections and recesses formed contiguously in the main scan direction. With such a configuration, the light emitted by the light emitting module 162 is refracted and diffused in the main scan direction by the projections and recesses on the incident surface of the light guide 2. As a result, such a configuration can provide a uniform illuminance distribution in the main scan direction. The pitch of the projections and recesses formed on the incident surface 21 can differ from the pitch of the LEDs arranged in the light emitting module 162. If the pitch of the projections and recesses differs from the pitch of the LEDs, the relative positions of the projections and recesses with respect to the LEDs are variable, so that any periodicity can be prevented from occurring in the illuminance distribution.

Figure 6:
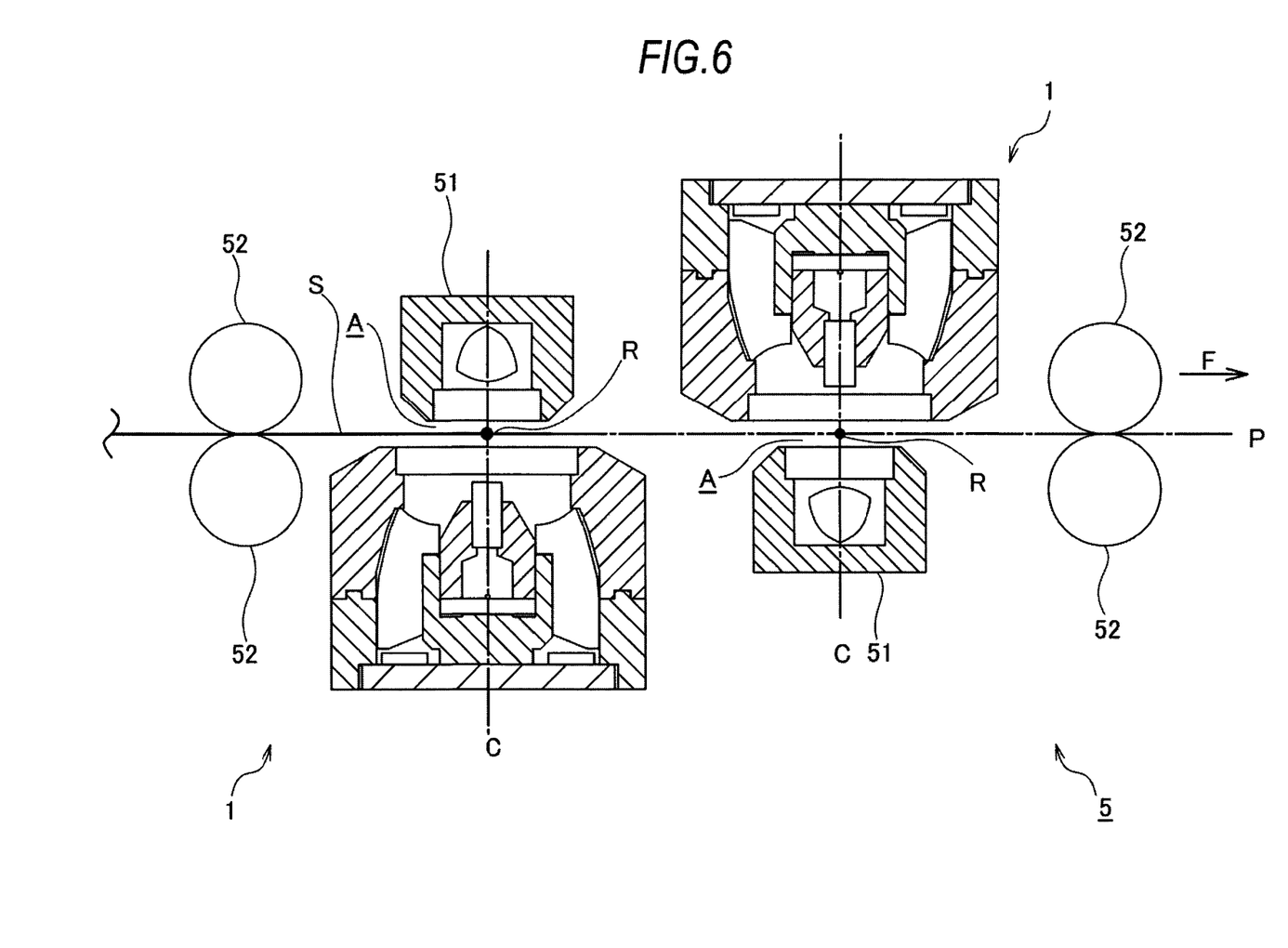
FIG. 6 is a schematic sectional view showing a configuration of an image reading apparatus according to the embodiment of the present invention.

Next, an image reading apparatus 5 according to the embodiment of the present invention will be described with reference to FIG. 6. FIG. 6 is a schematic sectional view showing a configuration of essential parts of the image reading apparatus 5. The image reading apparatus 5 is provided with the image sensor unit 1 for optically reading the bill S. The image reading apparatus 5 shown in this example is a sheet-feed type image reading apparatus and performs transmission reading and reflection reading of both surfaces of the bill S while conveying the bill S in the direction of the plane thereof. As shown in FIG. 5, the image reading apparatus 5 has two image sensor units 1, two light source units 51 for transmission reading and a predetermined number of conveyance rollers 52. The light source unit 51 for transmission reading is a light source used when the image sensor unit 1 performs transmission reading of the bill S. The light source unit 51 for transmission reading can be any of various well-known linear light sources that have the same effect as the light emitting module 162. For example, the light source unit 51 for transmission reading can be an array of light emitting elements arranged in series in the main scan direction or can be an arrangement including a rod-shape light guide that transforms light from light emitting elements into linear light. The conveyance rollers 52 are rotated by a driving mechanism (not shown) to relatively move the bill S at a predetermined conveyance speed with respect to the image sensor unit 1 in the conveyance direction.

The arrow F in FIG. 5 indicates the direction of the conveyance of the bill S by the conveyance rollers 52. The alternate long and short dashed line P in FIG. 5 indicates the conveyance path of the bill S. The two image sensor units 1 are arranged along the conveyance direction F for the bill S. Each of the two image sensor units 1 faces the corresponding one of the two light source units 51 for transmission reading with the conveyance path P of the bill S interposed therebetween. The two pairs of the image sensor unit 1 and the light source unit 51 for transmission reading are disposed in the opposite orientations (in 180°-inverted postures orientations with respect to the bill S). One set of the image sensor unit 1 and the light source unit 51 for transmission reading performs reflection reading and transmission reading of one surface (a top surface) of the bill S. The other set of the image sensor unit 1 and the light source unit 51 for transmission reading performs reflection reading and transmission reading of the other surface (a back surface) of the bill S.

Reflection reading involves an operation of the light emitting module 162 emitting red light for each scan line and the sensor substrate 17 receiving the reflection light, an operation of the light emitting module 162 emitting green light and the sensor substrate 17 receiving the reflection light, and an operation of the light emitting module 162 emitting blue light and receiving the reflection light. If the light emitting module 162 includes an element that emits infrared light and an element that emits ultraviolet light, reflection reading further involves an operation of emitting infrared light and receiving the infrared light reflected by the bill S and an operation of emitting ultraviolet light and receiving the ultraviolet light reflected by the bill S. On the other hand, transmission reading involves an operation of the light source unit 51 for transmission reading emitting red light for each scan line and the sensor substrate 17 receiving the transmission light, an operation of the light source unit 51 for transmission reading emitting green light and the sensor substrate 17 receiving the transmission light, and an operation of the light source unit 51 for transmission reading emitting blue light and the sensor substrate 17 receiving the transmission light. As with reflection reading, if the light emitting module 162 includes an element that emits infrared light and an element that emits ultraviolet light, transmission reading further involves an operation of emitting infrared light and receiving the infrared light transmitted through the bill S and an operation of emitting ultraviolet light and receiving the ultraviolet light transmitted through the bill S. The image reading apparatus 5 periodically repeats the operations for each scan line described above while conveying the bill S with the conveyance rollers 52. In this way, the image reading apparatus 5 performs reflection reading and transmission reading of both surfaces of the bill S in one conveyance of the bill S.

The parts of the image sensor unit 1 that are not shown in the drawings or described in this specification can be configured the same as various well-known conventional image sensor units. Similarly, the parts of the image reading apparatus 5 that are not shown in the drawings or described in this specification can be configured the same as various well-known conventional sheet-feed type image reading apparatuses.

Although a sheet-feed type image reading apparatus has been described as the image reading apparatus 5, the present invention can equally be applied to a flat-bed type image reading apparatus.

The image sensor unit 1 and the image reading apparatus 5 have the following advantage. If the bill S is creased, the distance between the bill S and the cover member 15 at the reading line R varies when the bill S passes through the passage space A for the bill S. Then, if the illuminance distribution of the illumination light emitted from the emission surface 23 of the light guide 2 is nonuniform in the vertical direction (in the direction of the normal to the bill S), the illuminance differs, for example, between a part of the bill S that passes through a point closer to the cover member 15 and a part of the bill S that passes through a point closer to the light source unit for transmission reading. This can lead to a decrease of the reading accuracy. However, according to the present invention, the light guide 2 makes the illuminance distribution of the light illuminating the bill S uniform in the vertical direction. Therefore, the part of the bill S that passes through a point closer to the cover member 15 and the part of the bill S that passes through a point closer to the light source unit for transmission reading can be illuminated with light with an equal illuminance. Thus, a decrease of the reading accuracy can be prevented.

Next, a verification result of the advantage of the embodiment of the present invention will be described.

Figure 7:
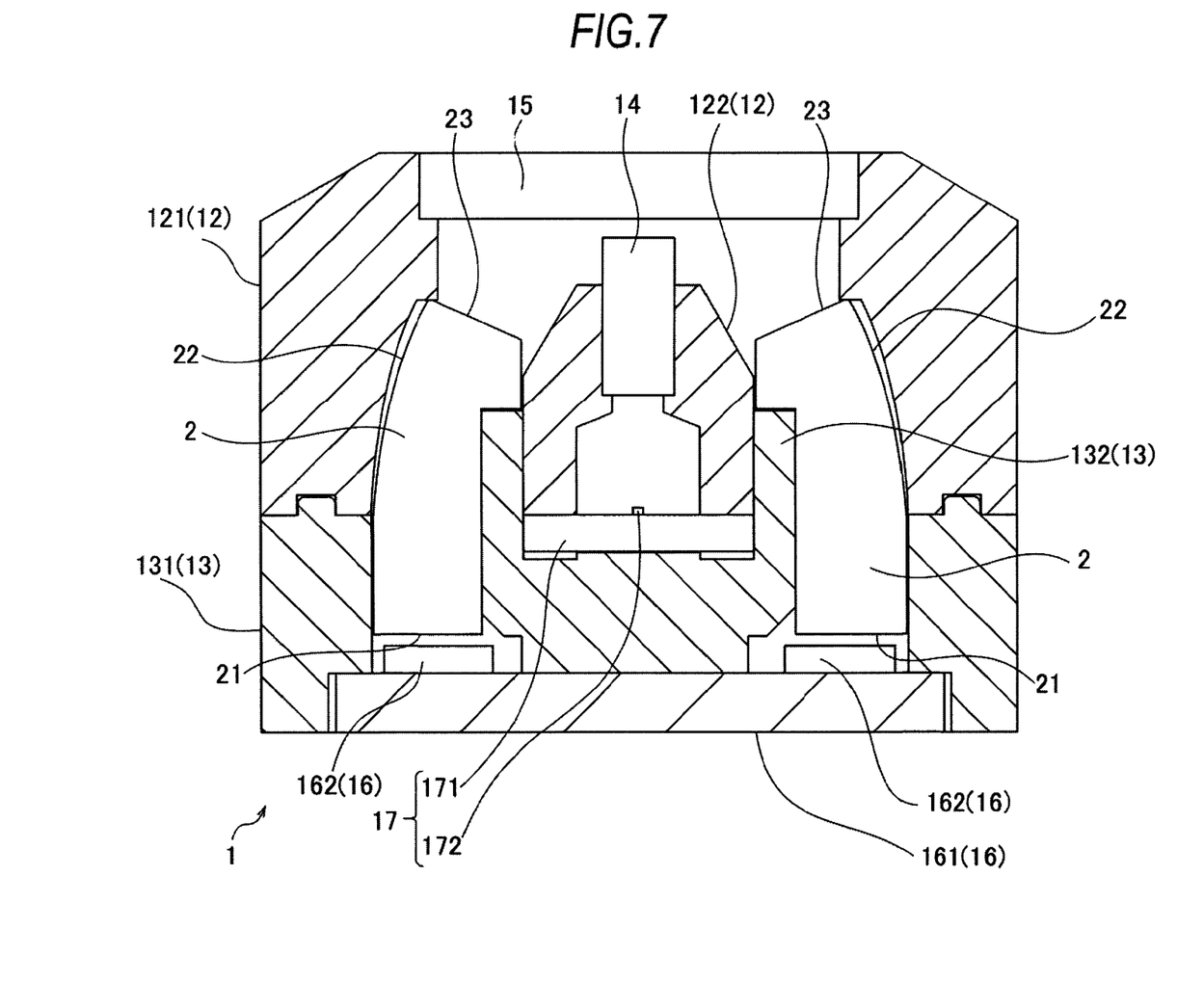
FIG. 7 is a schematic sectional view showing a configuration of an image sensor unit according to a comparative example.

FIG. 7 is a schematic sectional view showing, as a representative example, a configuration of an image sensor unit 9 comprising a light guide 2 having a flat incident surface 21, a curved reflection surface 22 and a flat emission surface 23 (corresponding to a comparative example 7 described later). The same parts as those of the image sensor unit 1 according to the embodiment described above are denoted by the same reference numerals.

Table 1 shown below shows combinations of the incident surface 21, the reflection surface 22 and the emission surface 23 of different types in comparative examples 1 to 7.

the reading line R in the sub-scan direction according to the comparative examples 4 to 7. The position "0 mm" in the sub-scan direction in FIG. 8D denotes the position of the reading line R. FIGS. 8A to 8D show the illuminance distributions of the light emitted by the illumination apparatus on one side (left side), and the illuminances shown in these drawings are relative values with respect to the measurement of the illuminance at the reading line R.

Figure 8A:
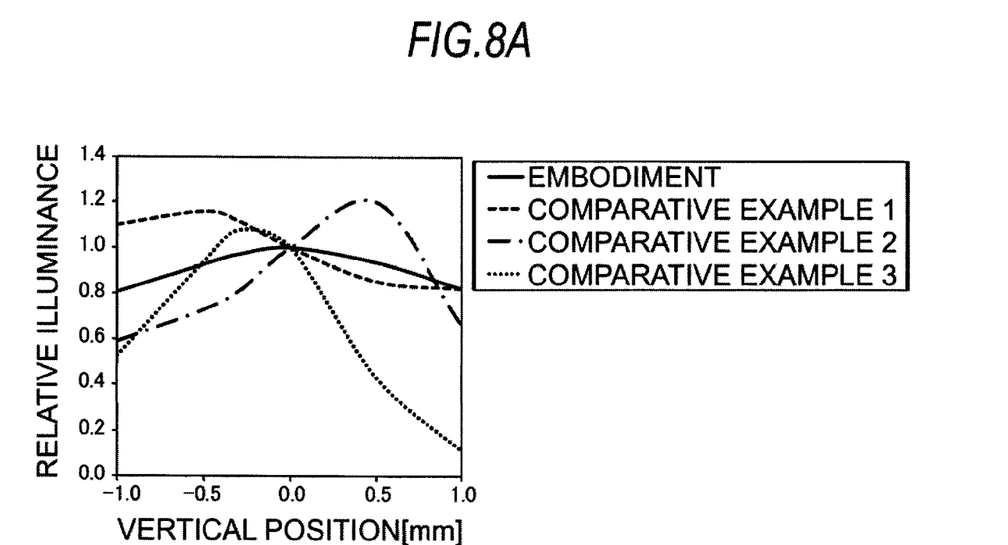
FIG. 8A is a graph showing illuminance distributions (relative illuminances) over vertical positions above and below a reading line according to the embodiment and comparative examples 1 to 3.
Figure 8B:
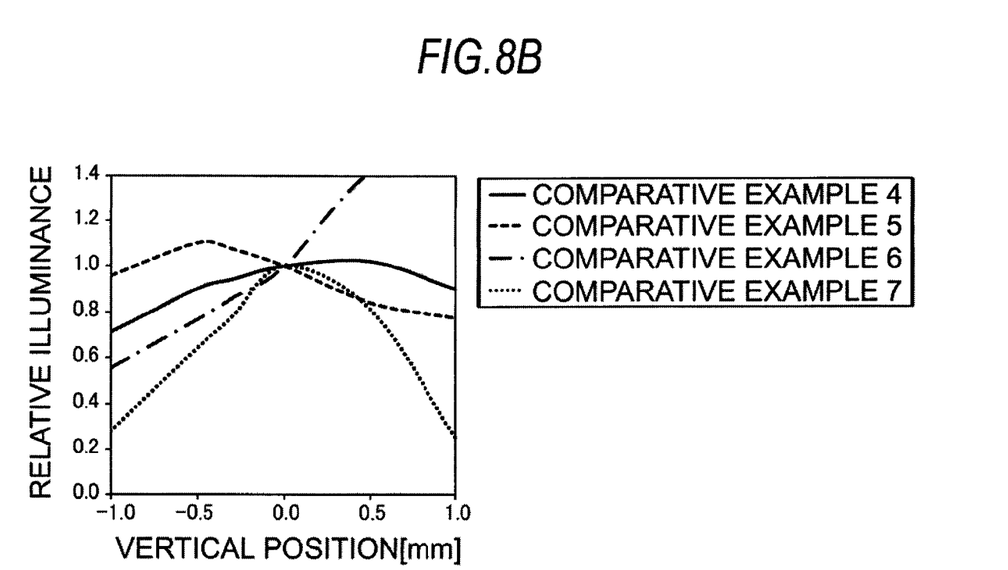
FIG. 8B is a graph showing illuminance distributions (relative illuminances) over the vertical positions above and below the reading line according to comparative examples 4 to 7.
Figure 8C:
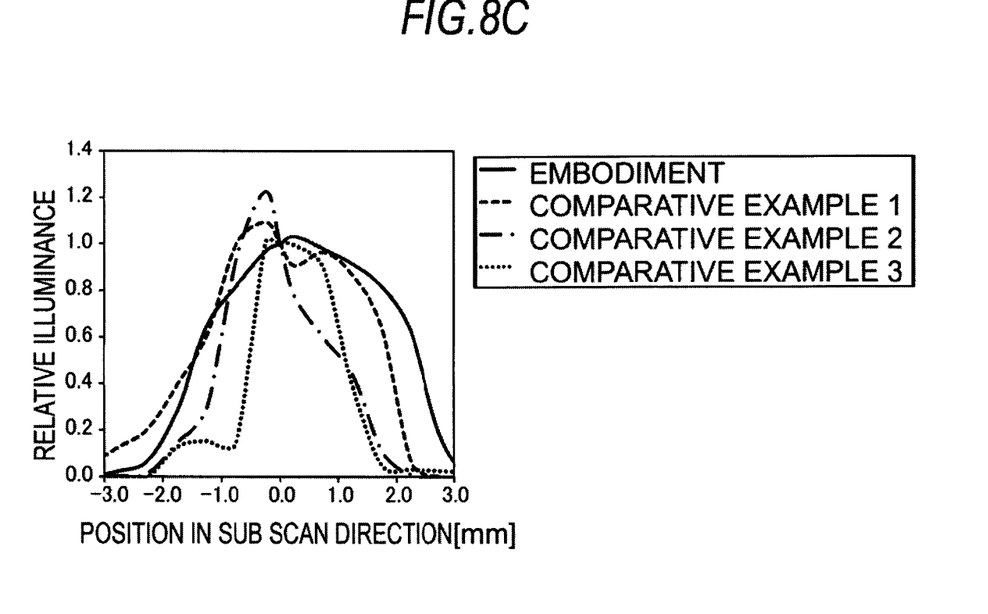
FIG. 8C is a graph showing illuminance distributions (relative illuminances) over positions on both sides of the reading line in a sub-scan direction according to the embodiment and the comparative examples 1 to 3.
Figure 8D:
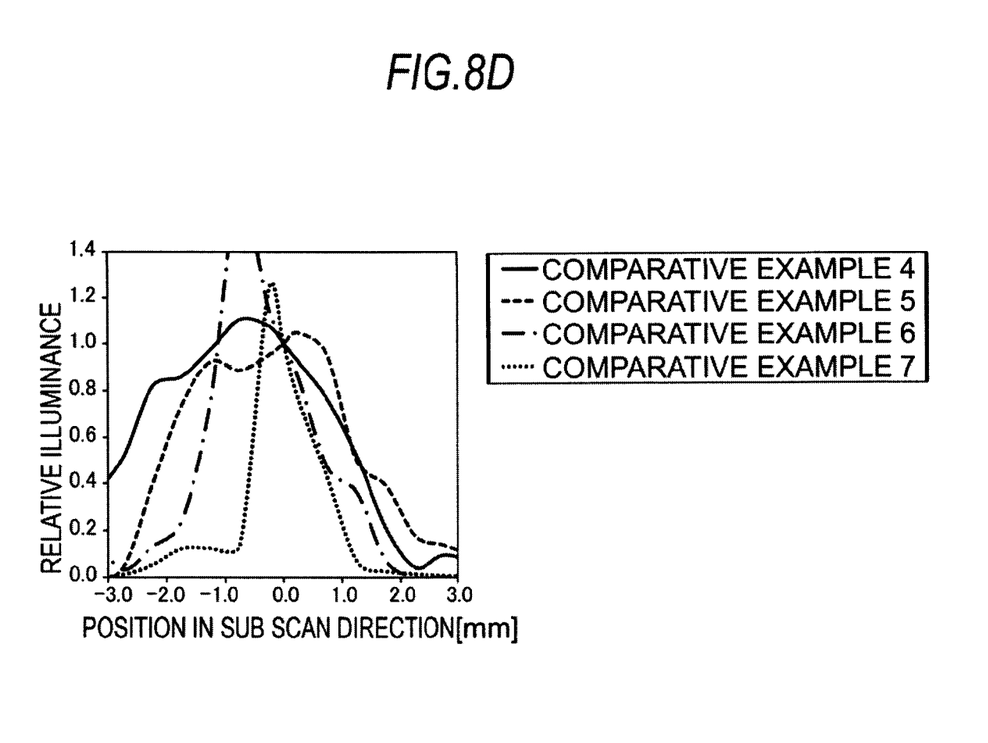
FIG. 8D is a graph showing illuminance distributions (relative illuminances) over the positions on both sides of the reading line R in the sub-scan direction according to the comparative examples 4 to 7.

As shown in FIGS. 8A and 8B, the illuminance distribution over vertical positions above and below the reading line R shows a tendency that the illuminance is at the maximum in the vicinity of the center of the passage space A for the bill S in the vertical direction and gradually decreases as the distance therefrom increases. Similarly, as shown in FIGS. 8C and 8D, the illuminance distribution over positions on both sides of the reading line R in the sub-scan direction shows a tendency that the illuminance is at the maximum in the vicinity of the reading line R and gradually decreases as the distance therefrom in the sub-scan direction increases.

According to the embodiment, the variation of the illuminance in the vicinity of the reading line R in the vertical direction and in the sub-scan direction is smaller than those according to the comparative examples 1 to 7. This is probably because the illumination light is diffused by the concave emission surface 23, thereby providing the uniform illuminance distribution. In addition, if the reflection surface 22 is the curved surface, the light reflected by the curved surface is

TABLE 1

Configurations according to embodiment and comparative examples

|  | Embodiment | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Emission surface 23 | Concave surface | Flat surface | Concave surface | Flat surface | Concave surface | Flat surface | Concave surface | Flat surface |
| Reflection surface 22 | Plural (four) flat surfaces | Plural (four) flat surfaces | Curved surface | Curved surface | Plural (four) flat surfaces | Plural (four) flat surfaces | Curved surface | Curved surface |
| Incident surface 21 | Inclined | Inclined | Inclined | Inclined | Flat surface | Flat surface | Flat surface | Flat surface |

The remainder of the configuration is the same as that of the image sensor unit 1 according to the embodiment described above.

FIG. 8A is a graph showing illuminance distributions over vertical positions above and below the reading line R according to the embodiment and the comparative examples 1 to 3. The vertical position "0 mm" in FIG. 8A denotes the center of the passage space A for the bill S in the vertical direction. FIG. 8B is a graph showing illuminance distributions over the vertical positions above and below the reading line R according to the comparative examples 4 to 7. The vertical position "0 mm" in FIG. 8B denotes the center of the passage space A for the bill S in the vertical direction. FIG. 8C is a graph showing illuminance distributions over positions on both sides of the reading line R in the sub-scan direction according to the embodiment and the comparative examples 1 to 3. The position "0 mm" in the sub-scan direction in FIG. 8C denotes the position of the reading line R. FIG. 8D is a graph showing illuminance distributions over the positions on both sides of focused to locally illuminate the vicinity of the reading line R, so that the width of the illuminated area is narrowed, and the variation of the illuminance increases. However, the reflection surface 22 formed by the plurality of flat surfaces has a reduced focusing effect and thus probably provides a uniform illuminance distribution.

In reading of the bill S, if the illuminance distribution is nonuniform, the reading accuracy or image quality can deteriorate when the bill S moves in the vertical direction or is creased. Therefore, it is preferred that the illuminance distribution of the illumination light in the vicinity of the reading line R is uniform in the vertical direction and the sub-scan direction. This fact also confirms that the configuration according to the embodiment can reduce the deterioration of the accuracy of reading of the bill S or the image quality.

Table 2 shows illuminance values of the light emitted by the illumination apparatus on one side (left side) at the reading line R in the embodiment and the comparative examples 1 to 7.

TABLE 2

| | Embodiment | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Illuminance value ($\mu W/mm^2$) | $6.39 \times 10^{-3}$ | $1.04 \times 10^{-2}$ | $8.38 \times 10^{-3}$ | $1.28 \times 10^{-2}$ | $5.81 \times 10^{-3}$ | $9.33 \times 10^{-3}$ | $8.04 \times 10^{-3}$ | $9.05 \times 10^{-3}$ |

Illuminance values according to embodiment and comparative examples

To verify the effect of the inclination of the incident surface 21, comparisons are needed between the embodiment and the comparative example 4, between the comparative examples 1 and 5, between the comparative examples 2 and 6 and between the comparative examples 3 and 7, which have the same configuration except for the incident surface 21.

As can be seen from Table 2, all the comparisons described above show that the inclination of the incident surface 21 improves the illuminance value. This is probably because the inclination results in a refraction effect: the light emitted by the light emitting module 162 is refracted from the incident surface 21 toward the reflection surface 22 and therefore can be efficiently guided, so that the illuminance of the illumination light on the reading line R can be improved (that is, the illumination efficiency can be improved).

As can be seen from the verification described above, the combination of the incident surface 21, the reflection surface 22 and the emission surface 23 according to the embodiment is the most advantageous, so that the illuminance distribution in the vicinity of the reading line R in the vertical direction and the sub-scan direction can be made uniform, and the illuminance can be improved.

Although an embodiment of the present invention has been described in detail above, the embodiment described above is just a specific example of embodiments of the present invention. The technical scope of the present invention is not limited to the embodiment described above. Many modifications can be made to the embodiment without departing from the spirit of the present invention, and the technical scope of the present invention includes those modifications. For example, although the bill S has been shown as an example of the object to be illuminated, the object to be illuminated may be a security or a check. The object to be illuminated can be any object that is desirably to be subjected to reflection reading and is not limited to any particular kind of object.

Although the light source unit 51 for transmission reading is disposed to face the image sensor unit 1 according to the embodiment described above, the present invention is not limited to such a configuration. For example, two image sensor units 1 may be disposed to face each other with a gap through which the bill S can pass interposed therebetween. With such a configuration, reflection reading of both surfaces of the bill S can be performed. Furthermore, the image sensor unit 1 may be provided with a light source for transmission reading. And two image sensor units 1 provided with a light source for transmission reading may be disposed to face with each other with a gap through which the bill S can pass interposed therebetween. With such a configuration, reflection reading of both surfaces of the bill S can be performed, and transmission reading of the bill S can also be performed by one of the image sensor units 1 using the light emitted by the light source for transmission reading provided in the other image sensor unit 1. In this case, both the image sensor units 1 do not always have to be provided with the light source for transmission reading.

Although the image sensor unit 1 has been described as having two illumination apparatuses each comprising the light emitting module 162 and the light guide 2, the image sensor unit 1 may have only one illumination apparatus.

According to the present invention, the illuminance of the light reflected by the illuminated object can be made uniform by making uniform the illuminance distribution of the illumination light emitted from the emission light of the light guide, in particular, the illuminance distribution in the direction of the normal to the illuminated object.

What is claimed is:

1. An image sensor unit that reads image information from an object to be illuminated, comprising:
a light source; and
a light guide that guides light emitted by said light source to said object to be illuminated,
wherein said light guide comprises:
an incident surface on which the light emitted by said light source is incident;
a reflection surface that reflects the light having entered the light guide through said incident surface; and
an emission surface from which the light reflected by said reflection surface is emitted toward said object to be illuminated, and
said reflection surface is formed by a plurality of flat surfaces,
wherein said plurality of flat surfaces forming the reflection surfaces are arranged along an arc-like curve.

2. The image sensor unit according to claim 1, wherein said incident surface faces said light source at an angle.

3. The image sensor unit according to claim 1, wherein a contour of a cross section of said emission surface taken along a plane perpendicular to a main scan direction is a concave curve.

4. The image sensor unit according to claim 1, wherein said incident surface has a projection and a recess formed in a main scan direction.

5. An image reading apparatus that reads image information from an object to be illuminated, comprising:
an image sensor unit that comprises:
a light source; and
a light guide that comprises an incident surface on which light emitted by said light source is incident, a reflection surface that is formed by a plurality of flat surfaces and reflects the light having entered the light guide through said incident surface, and an emission surface from which the light reflected by said reflection surface is emitted toward said object to be illuminated,
wherein the image sensor unit reads the image information from said object to be illuminated while relatively moving said object to be illuminated and said image sensor unit with respect to each other, and
wherein said plurality of flat surfaces forming the reflection surfaces are arranged along an arc-like curve.

6. The image reading apparatus according to claim 5, wherein said incident surface faces said light source at an angle.

7. The image reading apparatus according to claim 5, wherein a contour of a cross section of said emission surface taken along a plane perpendicular to a main scan direction is a concave curve.

8. The image reading apparatus according to claim 5, wherein said incident surface has a projection and a recess formed in a main scan direction.

9. The image sensor unit according to claim 1, wherein the arc-like curve is an elliptic or parabolic curve.

10. The image sensor unit according to claim 1, wherein said plurality of flat surfaces are contiguous to each other at an obtuse angle.

11. The image sensor unit according to claim 1, wherein a plurality of light emitting elements of said light source are arranged in a main scan direction of the image sensor unit.

12. The image reading apparatus according to claim 5, wherein the arc-like curve is an elliptic or parabolic curve.

13. The image reading apparatus according to claim 5, wherein said plurality of flat surfaces contiguous to each other at an obtuse angle.

14. The image reading apparatus according to claim 5, wherein a plurality of light emitting elements of said light source are arranged in a main scan direction of the image sensor unit.

15. An image sensor unit that reads image information from an object to be illuminated, comprising:

a light source that a plurality of light emitting elements of said light source are arranged in a main scan direction; and a light guide that guides light emitted by said light source to said object to be illuminated, wherein said light guide comprises:

an incident surface on which the light emitted by said light source is incident;

a reflection surface that reflects the light having entered the light guide through said incident surface; and an emission surface from which the light reflected by said reflection surface is emitted toward said object to be illuminated, and said reflection surface is formed by a plurality of flat surfaces, wherein said plurality of flat surfaces forming the reflection surfaces are arranged along an arc-like curve.

16. The image reading apparatus according to claim 15, wherein a contour of a cross section of said emission surface taken along a plane perpendicular to a main scan direction is a concave curve.

17. The image reading apparatus according to claim 15, wherein said incident surface has a projection and a recess formed in a main scan direction.

18. The image sensor unit according to claim 15, wherein the arc-like curve is an elliptic or parabolic curve.

19. The image sensor unit according to claim 15, wherein said plurality of flat surfaces are contiguous to each other at an obtuse angle.

* * * * *